Patented Jan. 17, 1928.

1,656,366

UNITED STATES PATENT OFFICE.

FREDERICK W. STERLING AND HARRY L. CROOKER, OF PHILADELPHIA, PENNSYLVANIA, ASSIGNORS TO B. H. DYER COMPANY, A CORPORATION OF DELAWARE.

ART OF CHEMICAL HEAT STORAGE.

No Drawing. Application filed August 22, 1923, Serial No. 658,746. Renewed April 8, 1927.

This invention relates to the art of chemical heat storage and more particularly to the use of chemicals which in going into solution absorb heat and in crystallizing give off their latent heat of fusion. Heating mediums of this kind have been in use for some time in hot bottles and the like and the most common medium employed has been sodium acetate either alone or in combination with other ingredients. When liquefied as by immersion of the containing vessel in boiling water, an unstable solution results which on exposure to the atmosphere, or on being subjected to friction or other external inciting cause, goes into crystallization, giving up heat as above set forth.

We have discovered that this customary solution is too unstable for use in hot bottles, crystallization being either brought about too readily, so that frequently the heating devices are unfit for use just at the times when needed, or with too much difficulty. We have discovered that the percentage of water of crystallization is a very important factor in obtaining a satisfactory solution; and we attribute the unsatisfactory results heretofore obtained in the art very largely to the fact that the water of crystallization content of the acetate on the market is variable, being either too great or insufficient, usually the latter.

We have also discovered that if a definite percentage of water is used in the mixture, a solution will result which, while sufficiently unstable to be readily set off into crystallization, is nevertheless, sufficiently stable to prevent crystallization from being brought about accidentally.

In carrying out our invention we prepare a solution in the following proportions: To 16 oz. of sodium acetate U. S. P., (containing ordinarily about 40% of water) we add ⅕ oz. of calcium chloride and add 6% of water by weight, bringing up the total percentage of water to 46. In this connection, we have found that a mixture in which there is substantially 42% of water will work, while 49% of water is too much, substantially 46% of water being the most satisfactory amount for practical purposes.

This mixture on being heated forms the desired solution having the characteristics above noted. After use, the crystals can be repeatedly brought into solution by reheating.

We use the calcium chloride in the preferred percentage given to cause the crystals to assume a less hard condition. This not only enables to reliquefy the crystals more readily, but also prevents rattling.

What we claim is:

1. An unstable solution yielding heat on crystallization comprising sodium acetate, calcium chloride and water, the proportion of water being 46% of the total.

2. An unstable solution yielding heat on crystallization comprising sodium acetate U. S. P., calcium chloride, and added water.

3. An unstable solution yielding heat on crystallization comprising sodium acetate U. S. P., calcium chloride, and added water in proportion of approximately 6% of the total by weight.

4. An unstable solution yielding heat on crystallization comprising sodium acetate, calcium chloride and water, in substantially the following proportions; sodium acetate, 16 oz., calcium chloride, ⅕ oz., and water, 6% by weight.

In testimony whereof, we have hereunto signed our names.

FREDERICK W. STERLING.
H. L. CROOKER.